Dec. 30, 1930.  A. R. ROGERS  1,786,632
FISH CUTTING MACHINE
Filed Aug. 21, 1929   3 Sheets-Sheet 2
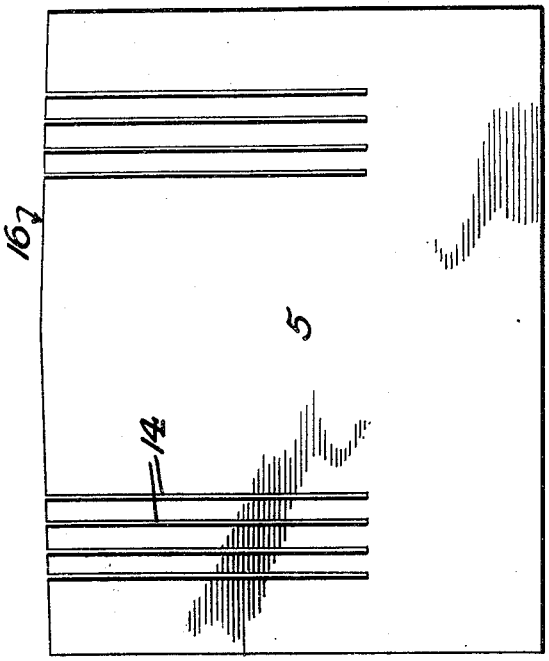
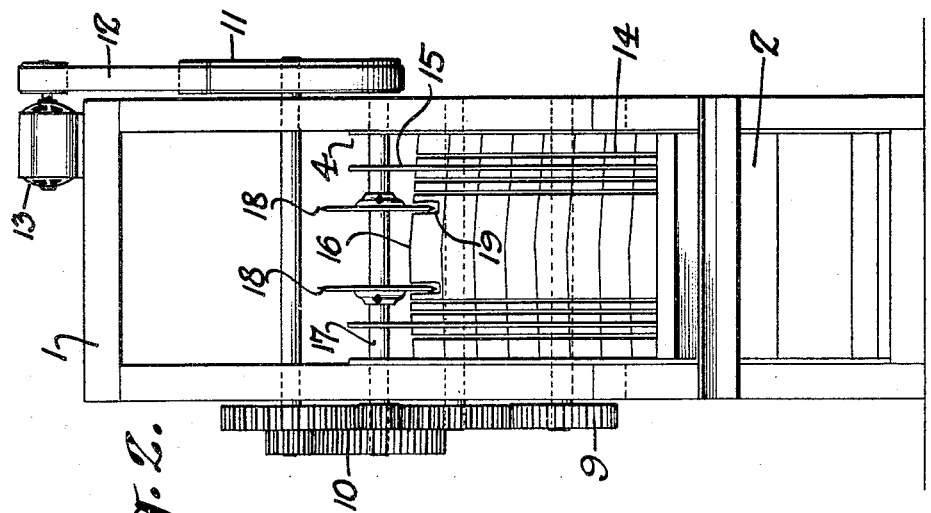

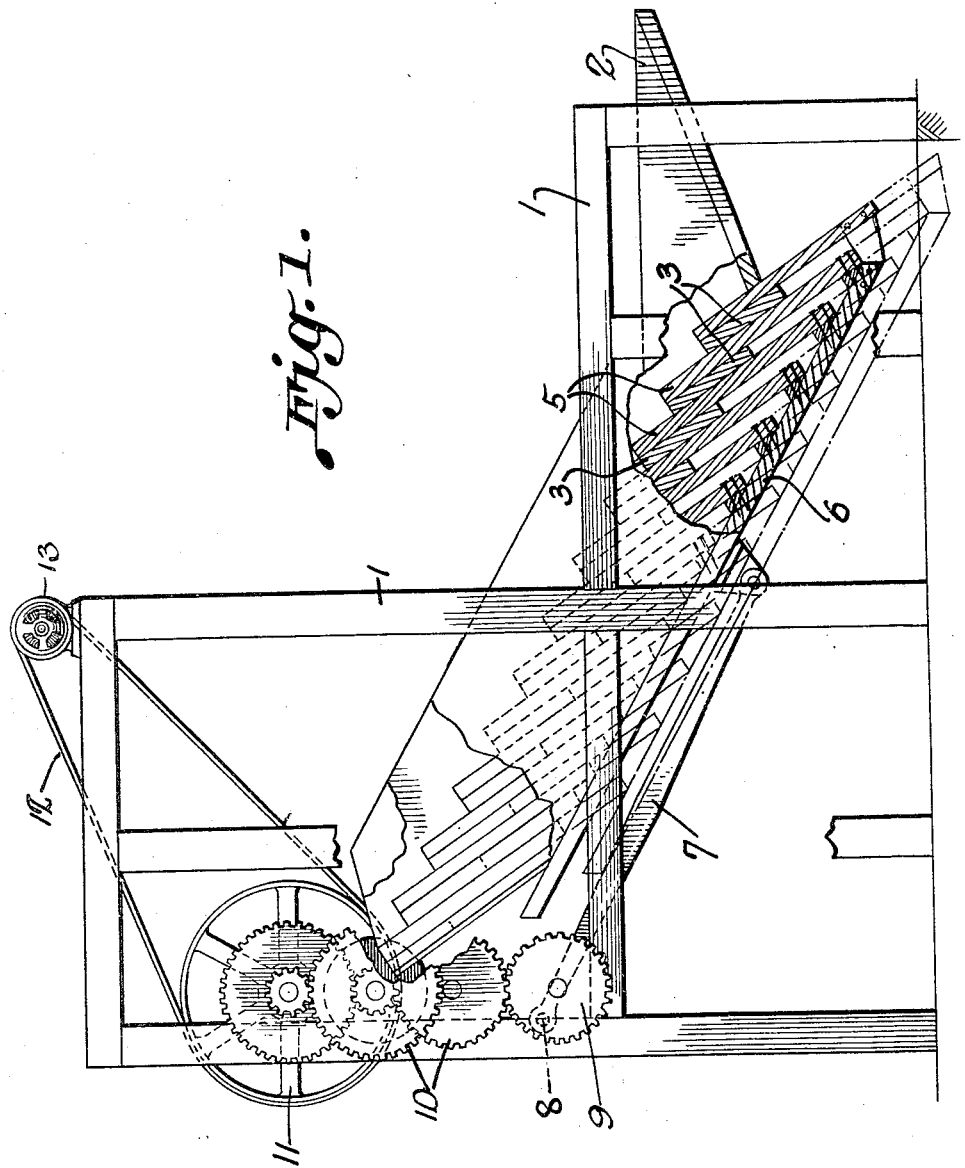

Dec. 30, 1930.  A. R. ROGERS  1,786,632
FISH CUTTING MACHINE
Filed Aug. 21, 1929     3 Sheets-Sheet 3
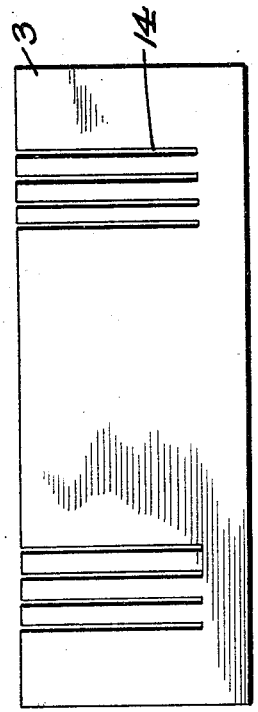
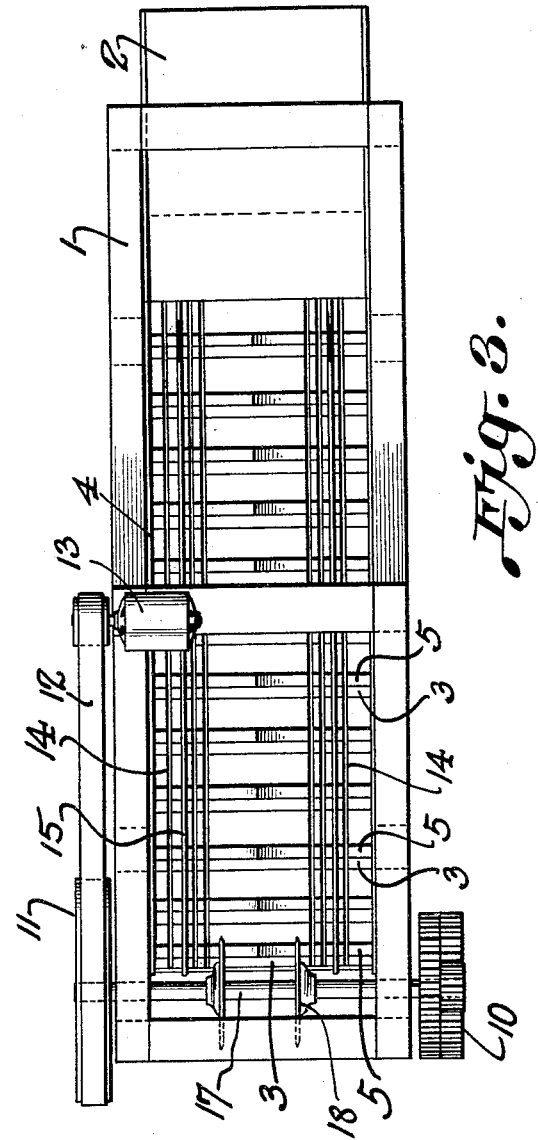
A. R. Rogers
Inventor
By C. A. Snow & Co.
Attorneys Patented Dec. 30, 1930

1,786,632

UNITED STATES PATENT OFFICE

ARTHUR R. ROGERS, OF JONESPORT, MAINE

FISH-CUTTING MACHINE

Application filed August 21, 1929. Serial No. 387,427.

This invention relates to machines for cutting fish. It is designed primarily for cutting sardines and other small fish although it is to be understood that the same can be used in cutting fish of larger sizes by properly proportioning the machine.

Heretofore it has been the practice generally to utilize water for handling the fish preparatory to cutting them. It frequently happens, however, that water for this purpose is not available without the use of a pumping system which adds materially to the cost of operation.

It is an object of the present invention to provide a fish cutting machine which does not require the use of water but operates mechanically to position the fish properly for presentation to the cutters in rapid succession, there being an adjustable gage by means of which the machine can be set to act on fish graded to a predetermined size.

A further object is to provide a machine of this character which does not require the use of an elevator.

A still further object is to provide a fish cutting machine formed of the minimum number of parts, which is inexpensive to construct and is of maximum efficiency.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a side elevation of the complete machine, parts being broken away.

Figure 2 is an end elevation.

Figure 3 is a plan view.

Figure 4 is an elevation of one of the stationary steps.

Figure 5 is an elevation of one of the movable steps.

Referring to the figures by characters of reference, 1 designates a frame in the lower portion of one end of which is arranged a hopper 2 the bottom of which is inclined downwardly toward an open end.

Supported in the frame is an inclined series of flat cross strips 3 spaced apart and stepped upwardly from the hopper, each of these strips, which constitutes a stationary step, being inclined upwardly and laterally away from the hopper. The strips or stationary steps 3 terminate at their ends against side strips 4 which can be formed of sheet metal and are secured to the sides of the frame 1.

Mounted to slide between the stationary steps 3 are flat strips 5 constituting movable steps. These movable steps fit snugly in the spaces between the stationary steps and, when in their lowermost positions, have their upper edges substantially flush with the corresponding edges of the next adjoining steps 3 farthest removed from the hopper 2.

All of the movable steps 5 are attached to an actuating bar 6 extending thereunder and this bar is connected by a pitman 7 to a crankshaft 8 carried by a gear 9. By means of a train of gears indicated generally at 10 motion can be transmitted to gear 9 from a pulley 11 which, in turn, received motion through a belt 12 or the like from a motor 13. The train of gears is adapted to greatly increase the speed so that a rapid reciprocation of the bar 6 is set up while the machine is in operation.

As all of the steps 3 and 5 are inclined it will be apparent that they cooperate to support the bar 6. The movable strips 5 are slid downwardly relative to the stationary steps 3 until the upper edges of the movable steps are brought to the level of the next adjoining stationary step nearest the hopper 2.

All of the steps are provided, near their ends, with slots 14, the corresponding slots in the steps being disposed in alinement. Thus gage strips 15 can be positioned in any of the alining slots so as to reduce or increase the width of the channel formed between the gage strips 15 and above the steps.

The movable steps have their upper edges inclined from their centers toward their ends as shown particularly at 16 in Figures 2 and 5. The upper edges of the stationary strips 3 are straight and horizontal from end to end.

One of the gears of the train 10 is secured to a transverse shaft 17 located adjacent to the uppermost steps 3 and 5. To this shaft are secured cutting disks 18 which can be adjusted toward or from each other so as to be disposed at any desired distances from the gage strips 15.

In practice the fish to be cut are first separated or graded to uniform sizes. The gages 15 are then adjusted into selected slots 14 so as to be at proper distances from the cutting disks 18 to insure severance of the heads of the fish at proper points. Thereafter the fish of the grade to be cut are dumped into the hopper 2 and will be fed by gravity into the path of the lowermost movable step 5. Each time this step moves upwardly along the adjacent stationary step 3 it will pick up one or more of the fish and elevate them to points above the upper edge of the adjacent step 3 whereupon the fish will slide onto the step 3. As step 5 moves upwardly the inclined edge thereof will tend to shift the fish toward one end of the step. All of the steps 5 recede downwardly and when they reach their lowermost positions the fish that had been left on the upper edges of the stationary steps 3 will slide downwardly to positions in the path or paths of the adjacent lowered movable step 5. When the movable steps again move upwardly they will carry with them the fish that have been deposited on their upper edges and direct them onto the upper edge of the next highest stationary step. Thus as the movable steps rapidly reciprocate, the fish taken in from the hopper 3 will be elevated with a step by step movement, each fish, during this movement being transferred successively from a movable step to a stationary step and from a stationary step to a movable step until it is finally brought to the upper end of the series of steps. By this time the inclined edges 16 of the movable steps will have shifted the fish toward one side or the other until their heads have been brought against the gage plates 15. Thus as the uppermost movable step pushes the fish thereon upwardly, they will be forced against the cutting disks 18, the heads severed, and the parts discharged from the ends of the machine. It is to be understood, of course, that the upper steps 3 and 5 are slotted as at 19 to receive the cutting disks.

It has been found in practice that a machine constructed and operated as described will operate efficiently to elevate, position, and sever fish of any sizes and as it is unnecessary to use water-elevating means, an elevator, and other structures that complicate and add to the expense of the mechanism, the apparatus can be produced and operated at a much lower cost than other types of fish cutting machines heretofore used.

What is claimed is:

1. In a machine of the class described fish holding means, fish cutting means at a higher level than the holding means, stationary steps leading from the holding means to the cutting means, and means mounted for reciprocation between the steps for transferring fish from one stationary step to the other successively to elevate it from the holding means to the cutting means.

2. The combination with a fish cutting element, and stationary steps disposed in a series inclined downwardly therefrom, of means mounted for reciprocation between the steps for transferring fish from each stationary step to the next adjoining stationary step thereabove and ultimately to the cutting element.

3. The combination with a fish cutting element and a series of spaced stationary steps inclined downwardly from said element, the steps of the series being inclined, of steps mounted for reciprocation between the stationary steps, and means for simultaneously actuating said reciprocating steps for transferring fish from the stationary steps to the next adjoining stationary steps thereabove and ultimately to the cutting element.

4. The combination with a fish cutting element, of a series of spaced, inclined stationary steps leading upwardly to the cutting element, and means mounted for reciprocation between the stationary steps for transferring fish from each step to the next adjoining step thereabove, said means constituting means for deflecting fish toward the ends of the steps on which they are deposited.

5. The combination with a fish cutting element, and an inclined series of spaced stationary steps leading upwardly to the cutting element, of gages extending through the steps and providing a fish receiving space above the steps leading to the cutter, and means mounted for reciprocation between the steps for transferring fish from each step to the next adjoining step thereabove.

6. The combination with a fish cutting element, of a series of spaced stationary steps leading upwardly to the cutting element, all of said steps being slotted, gages adjustably mounted in the slotted steps and providing a fish channel of variable width leading to the cutting element, and means mounted for reciprocation between the stationary steps for lifting fish from each of the steps and depositing the same upon the next adjoining step thereabove.

7. The combination with spaced inclined stationary steps disposed in an upwardly inclined series, and fish cutting means at the upper end of said series, of means for directing fish onto the upper edge of the lower step of the series, and means mounted for reciprocation between the stationary steps for lifting fish from each of the steps and depositing the same on the next adjoining step thereabove thereby to feed the fish to the cutting element.

8. The combination with spaced inclined stationary steps disposed in an upwardly inclined series, and fish cutting means at the upper end of said series, of means for directing fish onto the upper edge of the lower step of the series, and means mounted for reciprocation between the stationary steps for lifting fish from each of the steps and depositing the same on the next adjoining step thereabove thereby to feed the fish to the cutting element, said means including strips guided by the stationary steps, a connection between the strips and means for reciprocating said connection to simultaneously slide the strips back and forth between the stationary steps.

In testimony that I claim the foregoing as my own, I have hereto affixed my signature.

ARTHUR R. ROGERS